United States Patent
Mowery et al.

(10) Patent No.: US 6,925,539 B2
(45) Date of Patent: Aug. 2, 2005

(54) DATA TRANSFER PERFORMANCE THROUGH RESOURCE ALLOCATION

(75) Inventors: Philip T. Mowery, Oklahoma City, OK (US); Kenny T. Coker, Mustang, OK (US); William J. Hakel, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 200 days.

(21) Appl. No.: 10/176,207

(22) Filed: Jun. 20, 2002

(65) Prior Publication Data

US 2003/0149838 A1 Aug. 7, 2003

Related U.S. Application Data

(60) Provisional application No. 60/354,627, filed on Feb. 6, 2002.

(51) Int. Cl.[7] .............................................. G06F 12/00
(52) U.S. Cl. ...................... 711/158; 711/151; 711/113; 710/5; 710/6; 710/40; 710/244
(58) Field of Search .................... 711/112–113, 135, 711/140, 158, 167–169, 137, 213, 151; 710/40–45, 129, 5–6, 52–64, 72–74, 244, 310; 709/103

(56) References Cited

U.S. PATENT DOCUMENTS

| | | | | |
|---|---|---|---|---|
| 5,289,580 A | * | 2/1994 | Latif et al. ..................... 710/63 |
| 5,581,245 A | * | 12/1996 | Nozaki ....................... 340/7.28 |
| 5,694,568 A | * | 12/1997 | Harrison, III et al. ...... 711/213 |
| 5,729,718 A | * | 3/1998 | Au .............................. 711/167 |
| 5,809,530 A | * | 9/1998 | Samra et al. ................ 711/140 |
| 5,890,210 A | | 3/1999 | Ishii et al. |
| 6,023,720 A | | 2/2000 | Aref et al. |
| 6,085,274 A | | 7/2000 | Seeman |
| 6,112,265 A | * | 8/2000 | Harriman et al. ............. 710/40 |
| 6,170,042 B1 | * | 1/2001 | Gaertner et al. ............ 711/158 |
| 6,272,565 B1 | * | 8/2001 | Lamberts ...................... 710/43 |
| 6,301,640 B2 | | 10/2001 | Barve et al. |
| 6,378,036 B2 | | 4/2002 | Lerman et al. |
| 6,389,508 B1 | | 5/2002 | Tamura |
| 6,393,550 B1 | | 5/2002 | Fetterman et al. |
| 6,470,415 B1 | * | 10/2002 | Starr et al. ................... 711/104 |
| 6,704,316 B1 | * | 3/2004 | He .............................. 370/397 |
| 6,826,630 B2 | * | 11/2004 | Olds et al. ...................... 710/6 |
| 2003/0084252 A1 | * | 5/2003 | Talagala ..................... 711/135 |

* cited by examiner

*Primary Examiner*—Nasser Moazzami
(74) *Attorney, Agent, or Firm*—Fellers, Snider, et al.

(57) ABSTRACT

Method and apparatus for transferring data between a host device and a data storage device having a first memory space and a second memory space. The first memory space employs a first command queue and a second command queue. The host issues access commands to store and retrieve data. The device stores commands in the first command queue and moves the commands to the second command queue. Write commands are removed from the first command queue and a message is sent to the host device to signal that the command has completed. Read and write commands are sorted at the second command queue for execution in an efficient order. Host transfer resources and disc transfer resources are utilized in such a way as to allow independent operation and to allow transfers using both sets of resources at once. More queue space is available for commands at the first command queue.

20 Claims, 4 Drawing Sheets

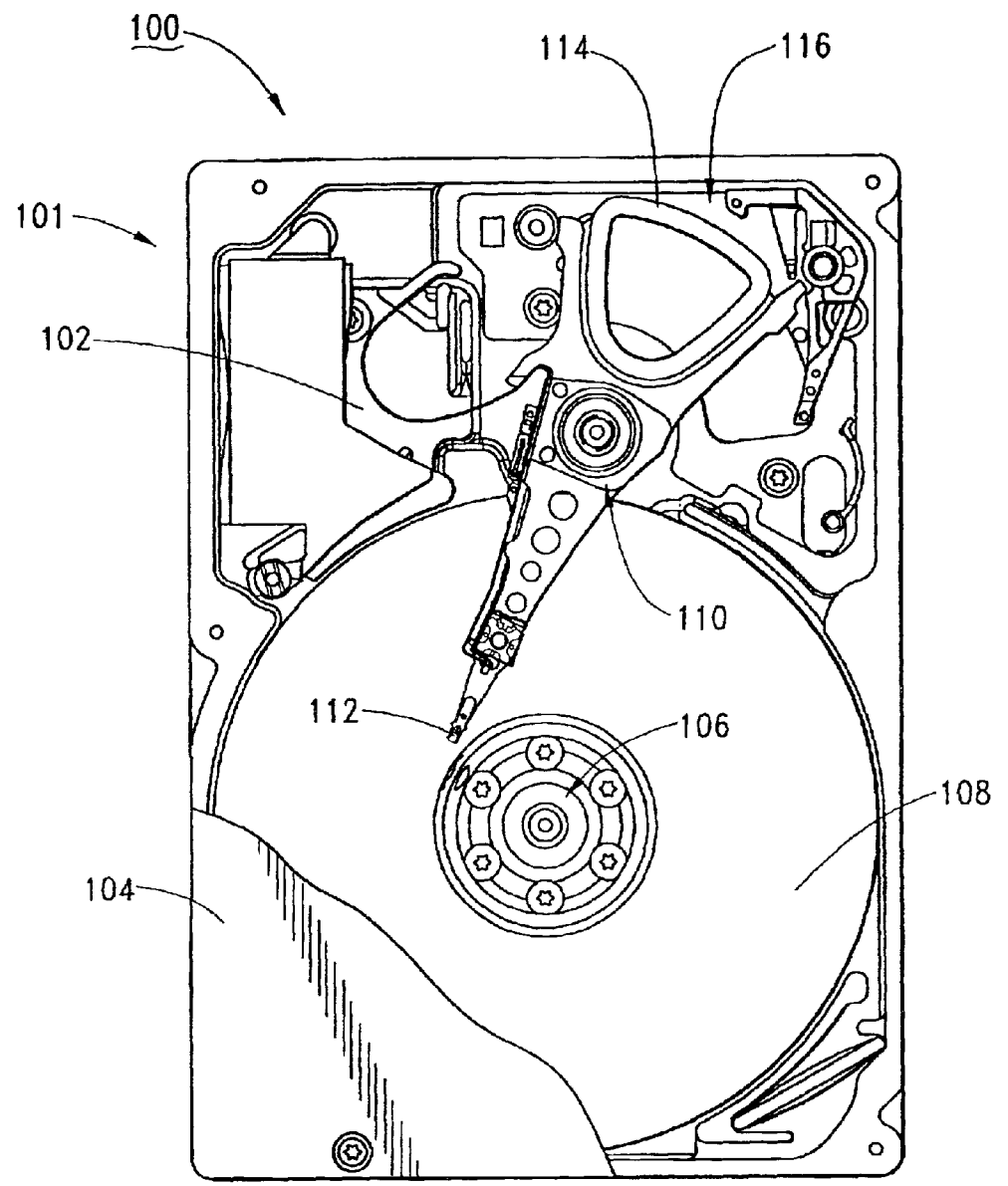
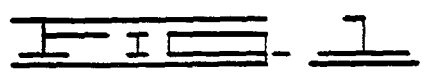
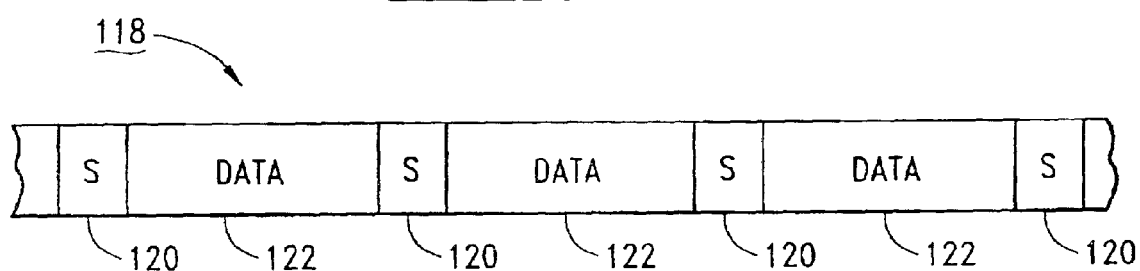
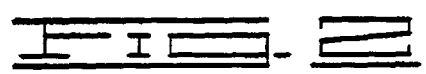

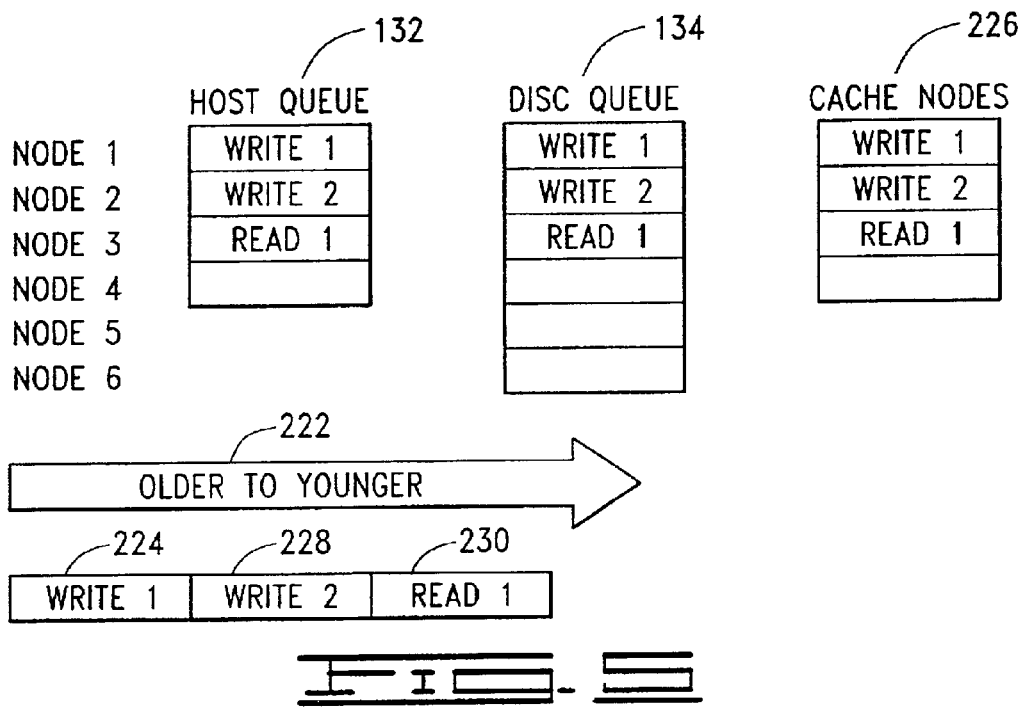
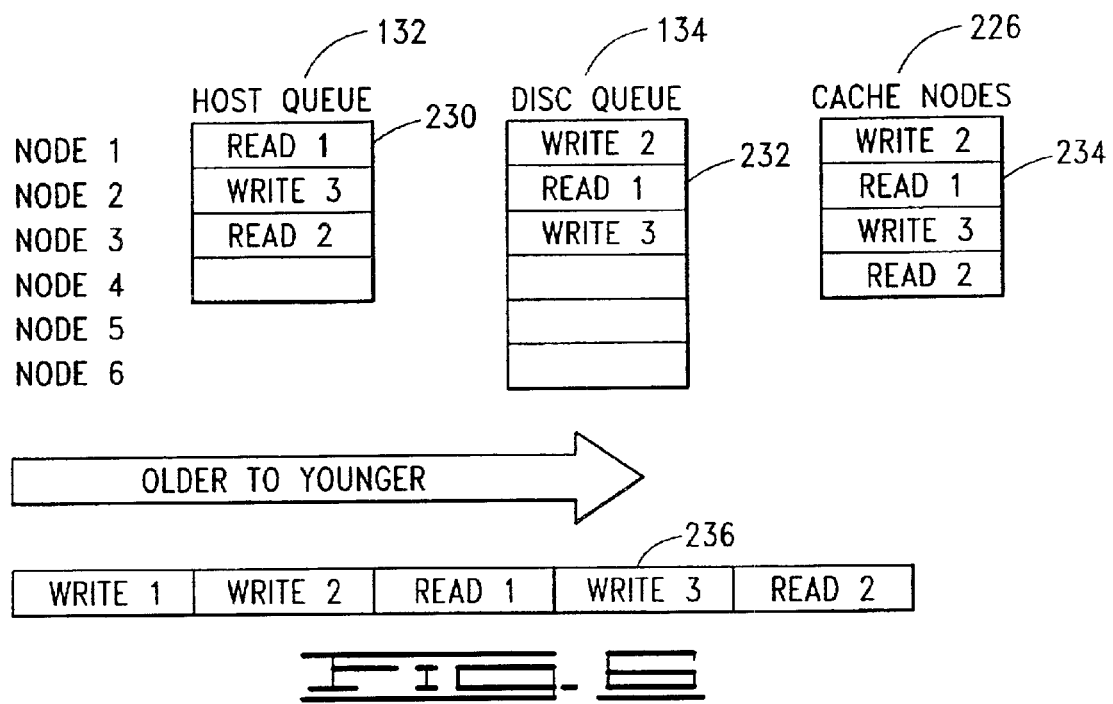

DATA TRANSFER PERFORMANCE THROUGH RESOURCE ALLOCATION

RELATED APPLICATIONS

This application claims priority to United States Provisional Application No. 60/354,627 filed Feb. 6, 2002.

FIELD OF THE INVENTION

The claimed invention relates generally to the field of data storage devices, and more particularly, but not by way of limitation, to an apparatus and method for optimizing the transfer of data between a host device and a data storage device.

BACKGROUND

Data storage devices come in many different forms and store many different types of data. Various forms of data are stored on a variety of storage media. A disc drive is a data storage device used to store digital data. A typical disc drive includes a number of rotatable magnetic recording discs that are axially aligned and mounted to a spindle motor for rotation at a high constant velocity. A corresponding array of read/write heads access the discs to write data to and read data from the discs.

The discs are divided into a number of addressable blocks that are assigned host-level addresses (sometimes referred to as logical block addresses or LBAs). Each LBA typically has a corresponding physical block address (PBA) on the disc. Servo information is arranged in a spoke-like fashion (or wedges) on the disc surface. These servo wedges are used by servo control circuitry to align a head with the appropriate portion of the medium to access the desired LBA.

In addition to the servo control circuitry to move the heads to the various tracks, the disc drives are also provided with read/write channel circuitry to write data to and read data from the discs, and interface control circuitry to facilitate communication and data transfer with a host device. A disc drive is typically configured to operate in accordance with an industry standard interface protocol, such as Small Computer Systems Interface (SCSI) or AT Attached (ATA, and known widely as IDE). Communications and data transfers are carried out between host and drive in accordance with these protocols.

Disc drives of the present generation typically accommodate command queuing, which allows multiple input/output (I/O) commands to be received in a command queue and executed by the drive in an order different than that received. SCSI protocols currently support up to 256 pending commands in the command queue, while ATA protocols allow up to 32 commands. A search strategy is used to execute the commands in an order that will potentially provide the highest transfer rate. For example, if several commands require access to data blocks close to the current position of the heads, and other commands require access to data blocks at distant locations on the discs, the drive may proceed to execute all of the local accesses before moving the heads to the distant locations and accessing the data blocks at the distant locations to minimize seek time (i.e., time spent moving from one track to the next).

The time required for a particular data block to rotate around and reach the head (latency) is an important factor when selecting the execution order, as delays in waiting for the disc to rotate significantly decrease the resulting transfer rate. Selection of the execution order typically includes estimating how much time it would take to reach each of the data blocks associated with the pending access commands based on latency and the time required to perform any necessary head switches and seeks.

A disc drive can typically employ various run-time selectable strategies (parameters) to improve the host throughput and read cache hit ratio, such as read on arrival (ROA) and read look ahead (RLA). ROA and RLA generally entail reading data blocks and placing the contents into the data buffer even though the host has not specifically requested the data from such data blocks, on the basis that the host may request the data in the near future. The data buffer can consist of one or more memory areas capable of storing information.

ROA involves performing a seek command to move the head to a destination track on which a target data block resides, and commencing to read the data blocks on the track that precede the target data block until the target data block reaches the head. By contrast, RLA involves receiving a command to move to a new target track, but because the target data block is a large angular distance away from the head, the drive delays seeking to the new track and instead maintains the head on the current track and reads additional data blocks on the current track before moving to the destination track and reading the target data block. The foregoing strategies can provide improved performance under certain circumstances, such as when the command stream has a high degree of locality.

Another run-time selectable parameter that can improve host throughput is write caching. Write caching involves delaying the writing of data received from the host in favor of execution of other previously requested accesses (as opposed to immediately writing the data upon receipt). Advantages associated with write caching include the fact that more commands are available to choose from during the sorting strategy, which statistically improves overall access times.

Commands that are selected for execution are allocated all the drive resources to execute that command. Commands that require only a data transfer from the host into the drive cache take control of the host interface and the associated cache transfer engine, as well as the disc channel and its associated cache transfer engine. Similarly, commands that require only a data transfer from the drive cache to the disc take control of the disc channel and associated transfer engine, as well as the host interface and its associated transfer engine.

Total allocation of drive resources in this fashion often prevents a command that requires only partial system resources from executing. Cached write commands that require only the disc resources to complete can delay the execution of read commands that can be satisfied from cache hits, since the cache to host transfer cannot be made until the prior write commands give up control of the system resources. Also, caching of write commands from the host prevents a read command from executing and accessing the disc until the host to cache transfer is complete.

These delays diminish drive performance and delay command execution. Drive resources that are available cannot be used while other drive resources are being utilized by a command. System cache can unnecessarily fill up waiting for commands to execute while other commands utilize resources that are not even needed for execution. Allocation of all system resources causes delays while commands wait for resources that are not in use.

Accordingly, there is a need for improvements in the art to provide effective allocation of system resources in a disc drive to improve data transfer performance. Although these improvements are useful in disc drive data storage devices, the embodiments herein are equally applicable to many forms of data storage devices.

SUMMARY OF THE INVENTION

In accordance with preferred embodiments, a data storage device is provided with a buffer (first memory space) and a storage medium (second memory space). A first command queue and a second command queue associated with host and media transfers are also provided.

A host device issues access commands to the data storage device from time to time to transfer data between the host device and the medium. Such access commands include write commands to write sets of data (writeback data) to respective logical block addresses (LBAs) defined on the medium, and read commands to retrieve sets of previously recorded data (readback data) from selected LBAs on the medium.

A hardware/firmware based interface circuit employs caching so that read commands and writeback data are temporarily stored in the buffer pending transfer to the medium in accordance with a sort strategy that sorts the pending read and write access commands in an order designed to optimize data transfer performance. Performance enhancing features (PEF) such as read on arrival (ROA) and read look ahead (RLA) are employed in conjunction with read commands to cache nonrequested data for later use.

The first command queue receives commands from the host and facilitates transfers of data between the host and cache. Such transfers can include write caching of write data to the buffer, and cache hits resulting from ROA or RLA activities that do not require an additional media access. Transfers involving the first command queue do not utilize media transfer resources during operation, thereby freeing system resources at the media transfer level.

The second command queue receives commands from the first command queue and facilitates transfers of data that require media access independently of commands at the first command queue. These commands allow additional commands to be received from the host into the first command queue, and undergo sorting at the second command queue level to provide for optimization of data transfer performance during media accesses.

Upon transfer of write commands from the first command queue to the second command queue the data storage device can report to the host that the command has been completed, despite the write data being moved only to the cache and not yet written to media. An analogous report to the host is not performed for read commands since the host would expect read data before a command complete report and the data is not available until the system has undergone a media access or retrieved read data from cache.

These and various other features and advantages that characterize the claimed invention will be apparent upon reading the following detailed description and upon review of the associated drawings.

BRIEF DESCRIPTION OF THE DRAWINGS

FIG. 1 is a plan view of a disc drive constructed and operated in accordance with preferred embodiments of the present invention.

FIG. 3 is a functional block diagram of the disc drive.

FIG. 5 generally illustrates a buffer with a series of commands awaiting disc access.

FIG. 6 is another illustration of a buffer with a series of commands awaiting disc access.

DETAILED DESCRIPTION

Figure 2:
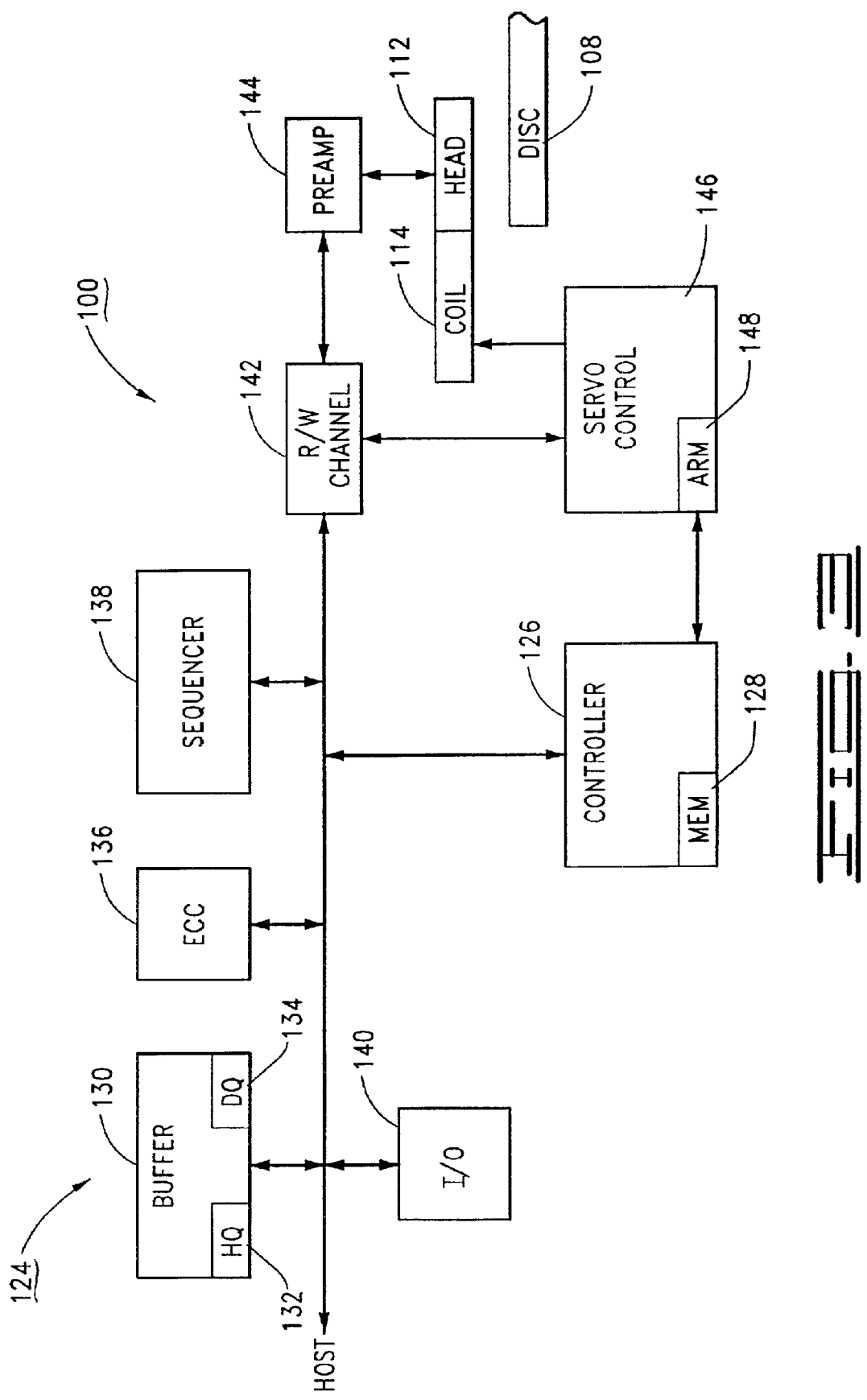
FIG. 2 shows the manner in which embedded servo data are arranged on each of the disc recording surfaces of the disc drive of FIG. 1.

Referring now to the drawings, FIG. 1 provides a top plan view of a disc drive block data storage device 100. The disc drive 100 includes a sealed housing 101 formed by a rigid base deck 102 and a top cover 104 (shown in partial cutaway).

Mechanical components of the disc drive 100 are supported within the housing 101, including a spindle motor 106 that rotates a number of recording discs 108 at a constant high speed, and an actuator assembly 110 supports a corresponding number of data transducing heads 112 adjacent the discs 108. The actuator assembly is rotated about an actuator axis through application of current to a coil 114 of a voice coil motor (VCM) 116.

Data are stored on a number of concentric tracks defined on the discs 108. FIG. 2 shows a portion of a track 118 from a selected disc surface. The track 118 includes a plurality of angularly arranged servo data fields 120. The servo data fields 120 provide position information used by servo control circuitry of the disc drive 100 to control the position of the heads 112.

User data from a host device are stored in data sectors defined in data areas 122 between adjacent pairs of the servo data fields 120. Each data sector stores a fixed amount of user data (such as 512 bytes) and is separately addressable by the host using a logical block address (LBA). The respective numbers of servo data fields 120 and data sectors per track can vary, but typical numbers for disc drives of the present generation are around 150–250 servo data fields and around 300–1000 data sectors per track. A typical disc drive can thus have several million consecutively numbered LBAs, depending upon the data capacity and format of the drive.

FIG. 3 provides a functional block diagram for the disc drive 100. A hardware/firmware based interface circuit 124 communicates with a host device (such as a personal computer, not shown) and directs overall disc drive operation. The interface circuit 124 includes a programmable controller (processor) 126 with associated memory 128, a buffer 130, an error correction code (ECC) block 136, a sequencer 138 and an input/output (I/O) control block 140.

The buffer 130 (also referred to herein as a "first memory space") temporarily stores user data during read and write operations, and includes a host command queue (HQ) 132 and a disc command queue (DQ) 134, where multiple pending access operations are temporarily stored pending execution. The buffer can comprise any number of memory areas sufficient to store data. The ECC block 136 applies on-the-fly error detection and correction to retrieved data. The sequencer 138 asserts read and write gates to direct the reading and writing of data. The I/O block 140 serves as an interface with the host device.

FIG. 3 further shows the disc drive 100 to include a read/write (R/W) channel 142 which encodes and serializes data during write operations and reconstructs user data from the discs 108 during read operations (the discs are also referred to herein as a "second memory space"). A preamplifier/driver circuit (preamp) 144 applies write currents to the heads 112 and provides preamplification of readback signals.

A servo control circuit 146 uses the servo data from the servo data fields 120 (FIG. 2) to provide the appropriate current to the coil 114 to position the heads 112 as required. The servo control circuit 146 preferably comprises a programmable ARM processor 148 (Advanced Reduced-Instruction-Set-Computer (RISC) Machine). The controller 126 communicates with the ARM 148 to move the heads 112 to the desired locations on the discs 108 during execution of the various pending access commands in the DQ 134.

As discussed below in greater detail, the interface circuitry 124 advantageously operates to optimize disc data throughput by dynamically allocating system resources independently within the system as needed. Commands are received at the HQ 132 and host-cache transfers are enabled. Performance enhancing features (PEF) that read nonrequested data to the buffer 130 provide data that can be transferred to the host without accessing the disc. Commands that do require disc access are moved to the DQ 134 for sorting and access to the disc 108.

Figure 4:
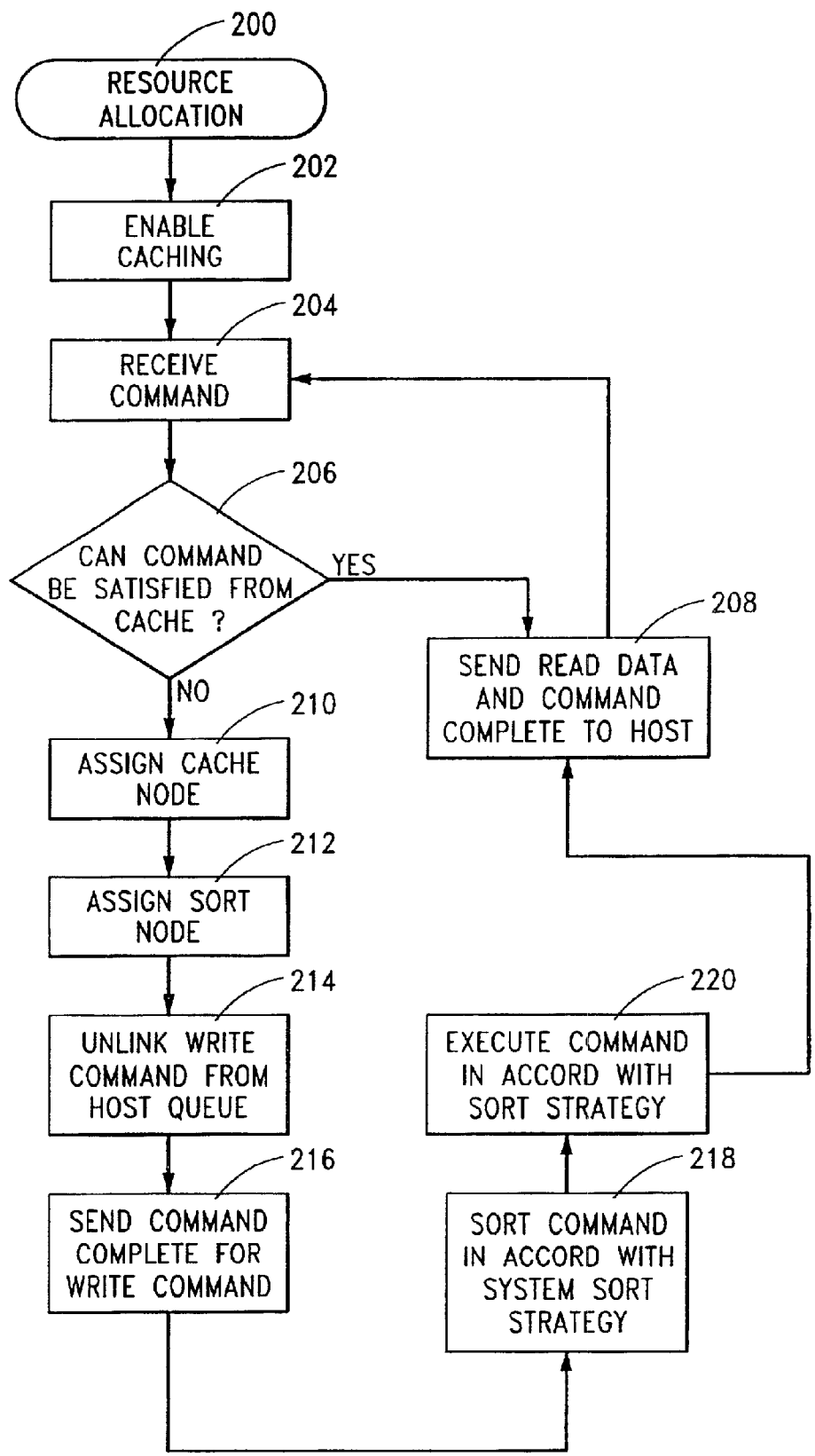
FIG. 4 is a flow chart for a RESOURCE ALLOCATION routine, generally illustrative of steps carried out by the disc drive in accordance with preferred embodiments of the present invention to transfer data between the disc drive and a host device.

FIG. 4 provides a flow chart for a RESOURCE ALLOCATION routine 200, illustrative of steps carried out by the interface circuit 124 in accordance with preferred embodiments of the present invention. At step 202 any desired write caching and PEFs are enabled. Write caching allows write data associated with a write command to be placed in the buffer 130 for future disc access in an order that improves disc performance. Write commands are sorted with other commands such that disc seeks are implemented in a faster order.

Likewise, PEFs allow nonrequested data to be retrieved from the disc during latency periods in which the drive is waiting for a disc seek. By storing the nonrequested data in the buffer 130, future read commands received from the host can be serviced without accessing the disc, also resulting in improved disc performance.

At step 204 the disc receives a command from the host into the HQ 132. The command can be a write command for which the host is requesting associated write data to be written to disc or a read command for which the host is requesting data.

Decision step 206 of the routine searches the buffer 130 to determine whether the command presently in the HQ 132 can be satisfied by data presently in the buffer 130. Successful cache hits of this nature are typically a result of PEFs that have cached nonrequested data in the buffer 130. In the event of a successful cache hit, the routine proceeds to step 208 where the read data subject to the cache hit is sent back to the host and completion of the command is thereby signaled.

If the command fails a cache hit at decision step 206, the routine proceeds to steps 210, 212 where the commands are assigned cache and sort nodes. For write commands, steps 210, 212 entail placing the associated write data in the buffer 130 (cache node) and placing the write command in the DQ 134 for sorting prior to disc access.

At step 214 the write command in the HQ 132 is unlinked from its DQ 134 counterpart. This allows the write command to be moved from the HQ 132 and frees space in the HQ 132 to allow additional commands to be received from the host. A command complete message is then sent to the host to signal that the write command has been completed at step 216, although the write data has not yet been written to disc.

For read commands, steps 210, 212 entail placing the read command in the buffer 130 (cache node) and in the DQ 134 for sorting prior to disc access. No data associated with the read command is placed in the buffer 130 since read data is not available until the disc 108 has been accessed (or the data is already present in the form of a successful cache hit).

Steps 214 and 216 are not applicable to read commands since read commands are not unlinked from the HQ 132 (as is the case with write commands at step 214). Also, command complete messages are not sent in conjunction with a read commands prior to execution of read commands (as is the case with write commands at step 216) since the return of read data to the host indicates that the command has completed.

The routine then proceeds to step 218 where the commands in the DQ 134 are sorted in accord with a sort strategy in use by the system. Both read and write commands are executed at step 220, generally in a fashion that maximizes disc performance. Depending on the sort strategy in use by the interface circuit 124, the system may choose to delay execution of pending commands in favor of receiving additional commands, which increases the statistical likelihood of a favorable sort.

The routine then proceeds to step 208 so that read data can be sent to the host, indicating that the command has been completed. The routine then returns to step 204 to receive the next command.

It is now helpful to refer to FIG. 5 to show the effects of the RESOURCE ALLOCATION routine 200 of FIG. 4 on a series of host read and write commands. As shown in FIG. 5, timing arrow 222 indicates the order in which commands are received from the host. Assuming an idle system with no pending commands in any command queue, WRITE 1 (224) is received from the host into the host queue 132 at node 1 (as in step 204 of FIG. 4).

Since write commands cannot typically be executed as a result of a cache hit (as in step 206 of FIG. 4) WRITE 1 is assigned cache and sort nodes (as in steps 210, 212) and the corresponding data is placed in the cache 226 (buffer 130). Since the system is idle, the write command WRITE 1 will be treated as a linked disc/host operation. Assuming the system sort strategy is such that another command is received prior to the execution of WRITE 1, WRITE 2 (228) and READ 1 (230) are then received to the HQ 132 (as in step 204 of FIG. 4).

In a write cache enabled drive WRITE 2 is received to a non-empty HQ 132 and the interface circuit 124 (FIG. 3) assigns resources. The associated write data for WRITE 2 is accepted into the cache 226 (as in step 210 of FIG. 4). The interface circuit 124 then assigns a sort node (as in step 212) by placing a write command in the DQ 134 for WRITE 2. WRITE 1 and WRITE 2 are then unlinked (as in step 214), and a command complete status is sent to the host (as in step 216).

At step 218 the write commands are sorted and WRITE 1 is executed at step 220. FIG. 6 shows an updated view as of the completion of WRITE 1. As shown in FIG. 6, WRITE 1 no longer is a pending command and WRITE 2 has been unlinked from the HQ 132. If READ 1 (230) fails a cache search it is assigned sort and cache nodes as shown at 232 and 234. If the data corresponding to the read command was available in the buffer 130 (i.e., did not fail the cache search) assignment of sort and cache nodes would not be necessary since the data would be available from the buffer 130 and no disc access would be required.

WRITE 3 (236) is then received at the HQ 132, assigned sort and cache nodes, a command complete message is sent and sorting of WRITE 3 in conjunction with the other pending commands in the DQ 134 is performed. WRITE 3 could potentially be sorted ahead of existing commands within the DQ 134, but the execution order depends on many variables such as sort routine parameters and location of the head 112 on the disc 108. If WRITE 3 is not sorted ahead of the pending WRITE 2 and READ 1 commands in the DQ 134, WRITE 2 and READ 1 complete, sent the appropriate data to the host, and only WRITE 3 is left in the HQ 132, DQ 134 and the cache node 226.

READ 2 (238) is then received at the HQ 132, undergoes a cache search for the requested data, is assigned sort and cache nodes, then is sorted for later execution. The RESOURCE ALLOCATION routine 200 continuously receives commands and processes the commands in this fashion.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the resource allocation routine without departing from the spirit and scope of the present invention.

In addition, although the embodiments described herein are directed to the transfer of data in a disc drive, it will be appreciated by those skilled in the art that the process can be used in other types of data storage devices without departing from the spirit and scope of the claimed invention.

What is claimed is:

1. A method comprising:
   receiving a command at a first command queue;
   loading data associated with the command into a first memory space and reporting to a host that the command pending in said first queue has been executed;
   moving the command to a second command queue when accessing a storage medium is required to execute the command, the second command queue storing at least one additional command previously moved to said second queue; and
   executing the commands in the second command queue in a sequence selected to optimize overall data transfer performance between the host and the storage medium.

2. The method of claim 1, wherein the command in the loading step is a write command.

3. The method of claim 1, further comprising loading data obtained from performance enhancing features into the first memory space, wherein the first command queue is configured to accommodate a preselected maximum number of commands, and wherein the second command queue is configured to accommodate a greater number of commands than the preselected maximum number of commands.

4. The method of claim 3, wherein read data is retrieved from the first memory space without accessing the storage medium.

5. The method of claim 1, wherein the first command queue and the second command queue are located in the same memory location.

6. The method of claim 1, wherein data transferred between the host and the first memory space and data transferred between the first memory space and a second memory space occur independently.

7. The method of claim 1, further comprising the step of reporting to the host that more commands have been executed at the first command queue than have actually been executed.

8. A data storage device, comprising:
   a medium on which user data are stored;
   an interface circuit that processes commands from a host device to transfer the user data between the host and the medium;
   an intermediate memory location coupled to the interface circuit such that user data associated with write commands from the host and nonrequested data from the medium are stored;
   a first command queue coupled to the intermediate memory location that facilitates transfer of data between the intermediate memory location and the host and receives commands from the host; and
   a second command queue coupled to the intermediate memory location that facilitates transfer of data between the intermediate memory location and the medium and receives commands from the first command queue.

9. The data storage device of claim 8, wherein the interface circuit returns a command complete message to the host when a write command is transferred from the first command queue to the second command queue.

10. The data storage device of claim 8, wherein the commands are sorted at the second command queue and executed, and wherein, the second command queue having a greater capacity to store commands than the first command queue.

11. The data storage device of claim 8, wherein data transfer resources of the first command queue and the second command queue are independent of each other.

12. The data storage device of claim 8, wherein the first command queue and the second command queue are located in the same memory space.

13. The data storage device of claim 8, wherein the first command queue reports to the host that more commands have been executed than actually have been executed and wherein the second command queue sorts and executes the commands that the first command queue has reported as complete.

14. The data storage device of claim 8, wherein data associated with read commands is transferred to the host from the intermediate memory location without accessing the data recording medium.

15. The data storage device of claim 8, wherein all write commands are moved from the first command queue to the second command queue and removed from the first command queue.

16. The data storage device of claim 8, wherein a command in the first command queue that cannot be satisfied from the intermediate memory location is linked with the corresponding command in the second command queue until the command is executed.

17. A device comprising:
   a data buffer;
   a first command queue and a second command queue coupled to the data buffer; and
   means for allocating system resources within the device, including means for reporting to a host that commands have been executed before the commands have actually been executed.

18. The device of claim 17, wherein the means for allocating system resources comprises an interface circuit comprising the first command queue and the second command queue.

19. The device of claim 18, wherein the means for reporting to the host that commands have been executed before the commands have actually been executed comprises an I/O block of the interface circuit configured to interface with the host.

20. The device of claim 19, wherein transfer of data between the host and the buffer and between the buffer and a storage medium of the device occur independently.

* * * * *